United States Patent
Yueh

(10) Patent No.: US 7,257,428 B2
(45) Date of Patent: Aug. 14, 2007

(54) CONTROL MODULE CO-CONSTRUCTED WITH CAR AUDIO APPARATUS

(75) Inventor: Wen Hsiang Yueh, Hsinchuang (TW)

(73) Assignee: Partner Tech Corp., Taipei (TW)

( * ) Notice: Subject to any disclaimer, the term of this patent is extended or adjusted under 35 U.S.C. 154(b) by 582 days.

(21) Appl. No.: 10/796,252

(22) Filed: Mar. 10, 2004

(65) Prior Publication Data

US 2005/0202783 A1 Sep. 15, 2005

(51) Int. Cl.
*H04M 1/00* (2006.01)
(52) U.S. Cl. .................. 455/569.2; 455/41.3; 455/41.2
(58) Field of Classification Search .............. 455/41.3, 455/41.2, 575.2, 569.2, 66.1, 569.1
See application file for complete search history.

(56) References Cited

U.S. PATENT DOCUMENTS

| | | | |
|---|---|---|---|
| 6,349,223 B1 * | 2/2002 | Chen | 455/569.2 |
| 6,892,051 B2 * | 5/2005 | Schmitt et al. | 455/41.2 |
| 7,149,551 B2 * | 12/2006 | Kim | 455/569.1 |
| 2002/0197911 A1 * | 12/2002 | Holmes et al. | 439/638 |
| 2003/0045265 A1 * | 3/2003 | Huang et al. | 455/355 |
| 2004/0204163 A1 * | 10/2004 | Ou | 455/569.1 |

FOREIGN PATENT DOCUMENTS

TW 417920 1/2001

* cited by examiner

*Primary Examiner*—Lewis West
(74) *Attorney, Agent, or Firm*—Rosenberg, Klein & Lee

(57) ABSTRACT

A control module co-constructed with a car audio apparatus has a Bluetooth module, a car audio apparatus, a sound switch and a sound control circuit. The sound switch is disposed inside the car audio apparatus and connected with the sound signal processor. It is used to choose a sound signal sent from the Bluetooth earphone or the car audio apparatus and output the sound signal via the speaker. The sound control circuit is disposed inside the car audio apparatus and connected with the sound switch. When the Bluetooth earphone is plugged into the socket of the car audio apparatus, the sound switch will silence the car audio apparatus automatically and output the sound signal sent from the Bluetooth earphone via the speaker. When the Bluetooth earphone is taken out from the socket, the car audio apparatus will serve as a common audio apparatus.

2 Claims, 3 Drawing Sheets

CONTROL MODULE CO-CONSTRUCTED WITH CAR AUDIO APPARATUS

FIELD OF THE INVENTION

The present invention is directed to a control module co-constructed with a car audio apparatus, and more particularly, to a control module that combines a Bluetooth earphone with a car audio apparatus. By combination with the circuit of the car audio apparatus, the present invention can perform a switch action to silence the car audio apparatus automatically and output the sound signals sent from the Bluetooth earphone via a speaker when the Bluetooth earphone is plugged into a socket of the car audio apparatus.

BACKGROUND OF THE INVENTION

In general, a car audio apparatus combined with a hands-free handset of the cellular phone is available on the market, such as the one disclosed in Taiwan Patent 417920. As shown in FIG. 1, it primarily includes an encoder 60, a host 70 and an activating system 80. The encoder 60 is able to connect with the cellular phone and used to encode the sound signals sent from the cellular phone and the microphone.

The host 70 is mainly composed of a central processing unit and a digital signal processor. The digital signal processor is used to receive the sound signals sent from the cellular phone and the microphone and process these two kinds of sound signals under the control of the central processing unit. The sound signals of the microphone can thus be sent to the encoder 60 via the central processing unit and the sound signals of the cellular phone can also be sent to the audio apparatus via the central processing unit.

The activating system 80 has a silence activating circuit, which can be used to switch the audio apparatus according to the type of the sound signals of the digital signal processor. Thereby, it can automatically switch the audio apparatus to the cellular phone to make the audio apparatus serve as a hands-free handset when the cellular phone is in use.

In this way, a car audio apparatus combined with the hands-free handset circuit that can digitally process the sound signals of the cellular phone and the microphone can be produced.

As described above, the car audio apparatus can be silenced automatically and switched to a voice communication status when an incoming phone call is received by the cellular phone. After hanging up, it will be switched back to audio output status. However, it is not designed for combining the car audio apparatus and the Bluetooth earphone. Besides, it can't support any kind of cellular phone, either.

Moreover, there exists another car audio apparatus that has the functions of the cellular phone. The method is to place a subscriber identity module (SIM) card in the car audio apparatus for the control circuit of the car audio apparatus to access the data of the SIM card and output the sound signals sent from the cellular phone module via a speaker. However, it is not designed for combining the car audio apparatus and the Bluetooth earphone, either.

Consequently, if there is an apparatus that combines the functions of the car audio apparatus and the Bluetooth earphone, it will change the recent competition status of the market and consumers will like it much more than other products. Hence, the inventor of this application is motivated to devote his knowledge and experiences to develop the present invention.

SUMMARY OF THE INVENTION

An objective of the present invention is to provide a control module co-constructed with a car audio apparatus. When a Bluetooth earphone is plugged into a socket of the car audio apparatus, the car audio apparatus will be silenced automatically and output sound signals sent from the Bluetooth earphone via a speaker.

Another objective of the present invention is to provide a control module co-constructed with a car audio apparatus. When a Bluetooth earphone is used, the car audio apparatus will be silenced automatically without need for any hand manipulation. Hence, the driving safety can be ensured.

For reaching the objective above, the present invention provides a control module co-constructed with a car audio apparatus, primarily including elements as follows. A car audio apparatus has at least a speaker used for sound output and a socket. The car audio apparatus connects with a sound signal processor. A Bluetooth module is disposed in a Bluetooth earphone to provide an interface between the Bluetooth earphone and the car audio apparatus. A sound switch is disposed inside the car audio apparatus and connected with the sound signal processor. The sound switch is used to choose a sound signal sent from the Bluetooth earphone or the car audio -apparatus and output the sound signal via the speaker. A sound control circuit is disposed inside the car audio apparatus and connected with the sound switch. When the Bluetooth earphone is plugged into the socket of the car audio apparatus to make car audio apparatus connect with the Bluetooth module, the sound switch is controlled to silence the car audio apparatus automatically and output the sound signal sent from the Bluetooth earphone via the speaker. When the Bluetooth earphone is taken out from the socket, the car audio apparatus serves as a common audio apparatus.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION

Figure 1:
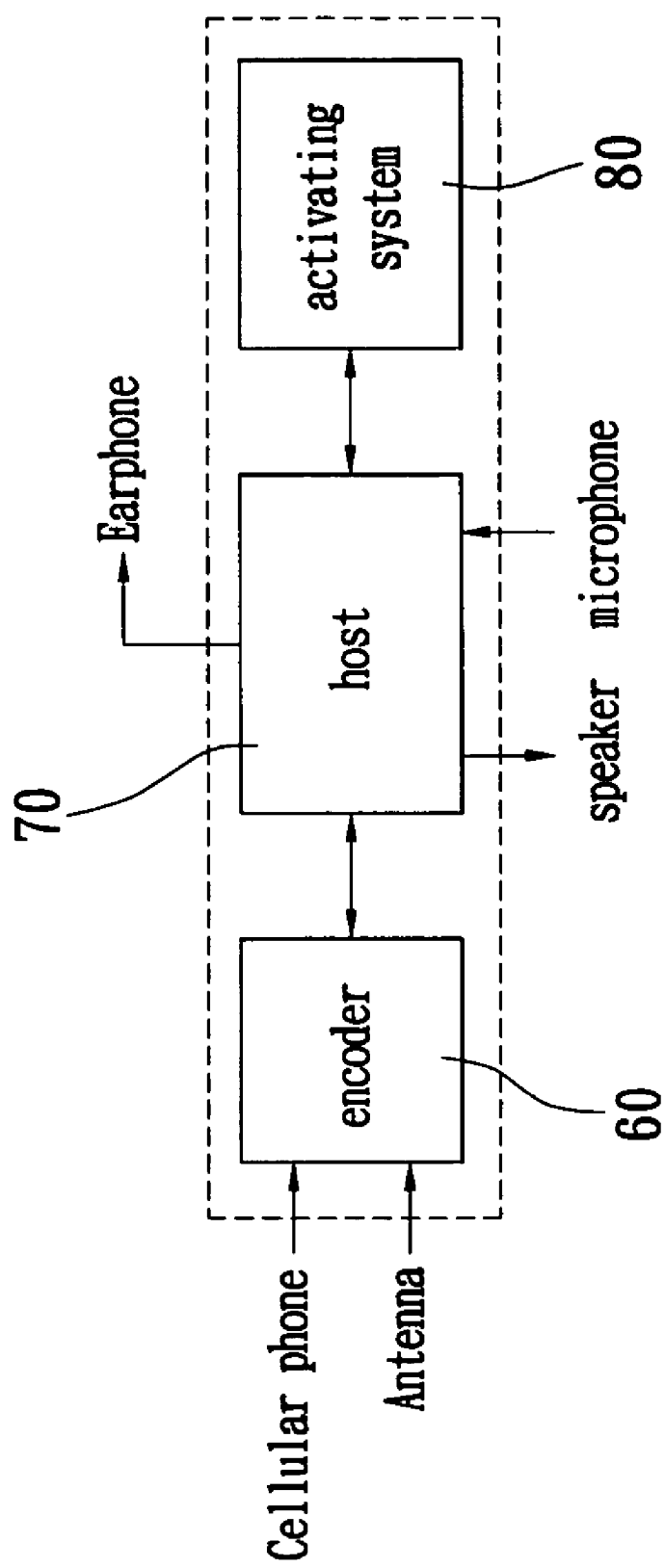
FIG. 1 is a block diagram of a conventional car audio apparatus.
Figure 2:
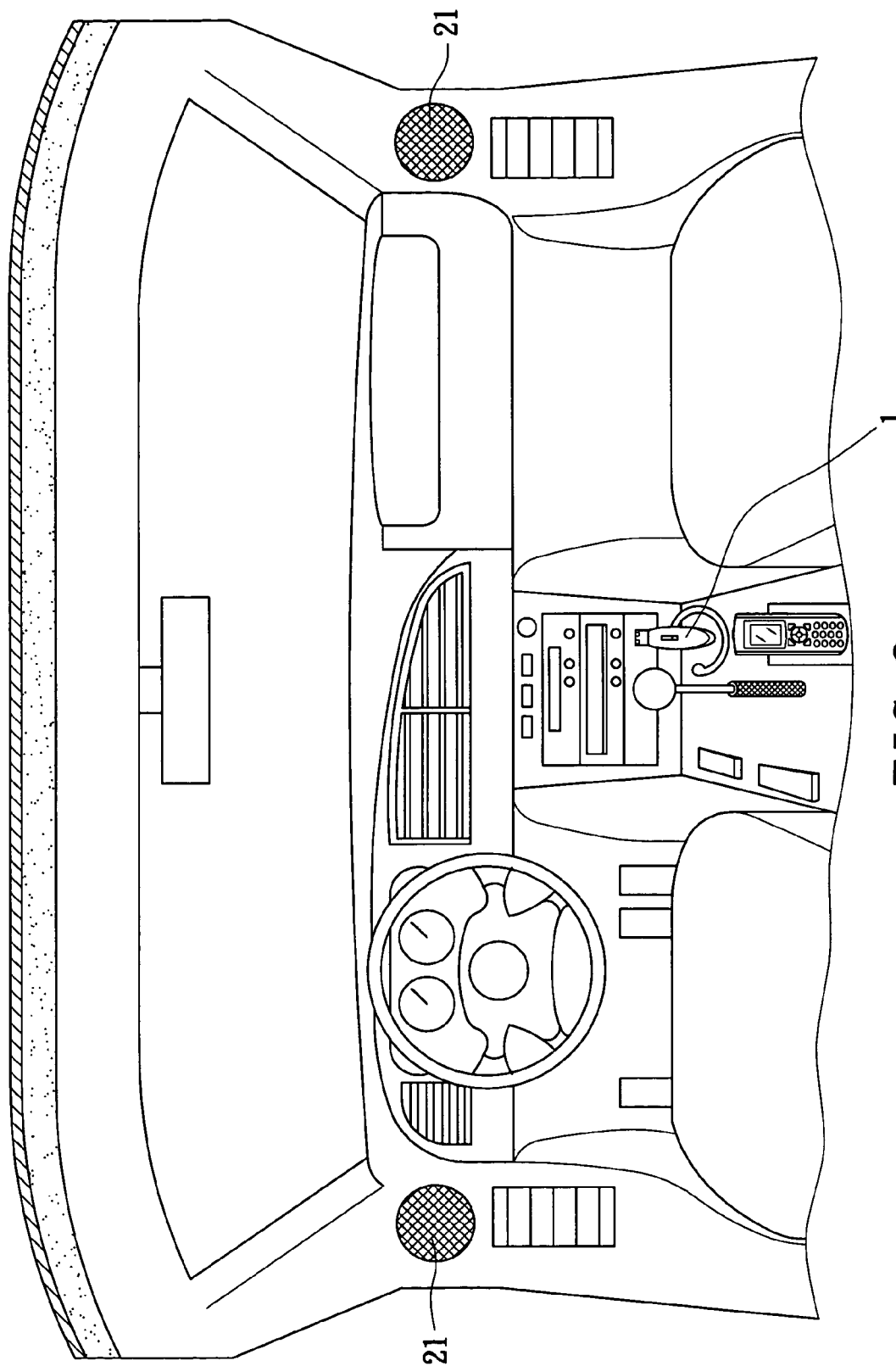
FIG. 2 is a schematic diagram for showing a car audio apparatus installed in a car in accord with the present invention.
Figure 3:
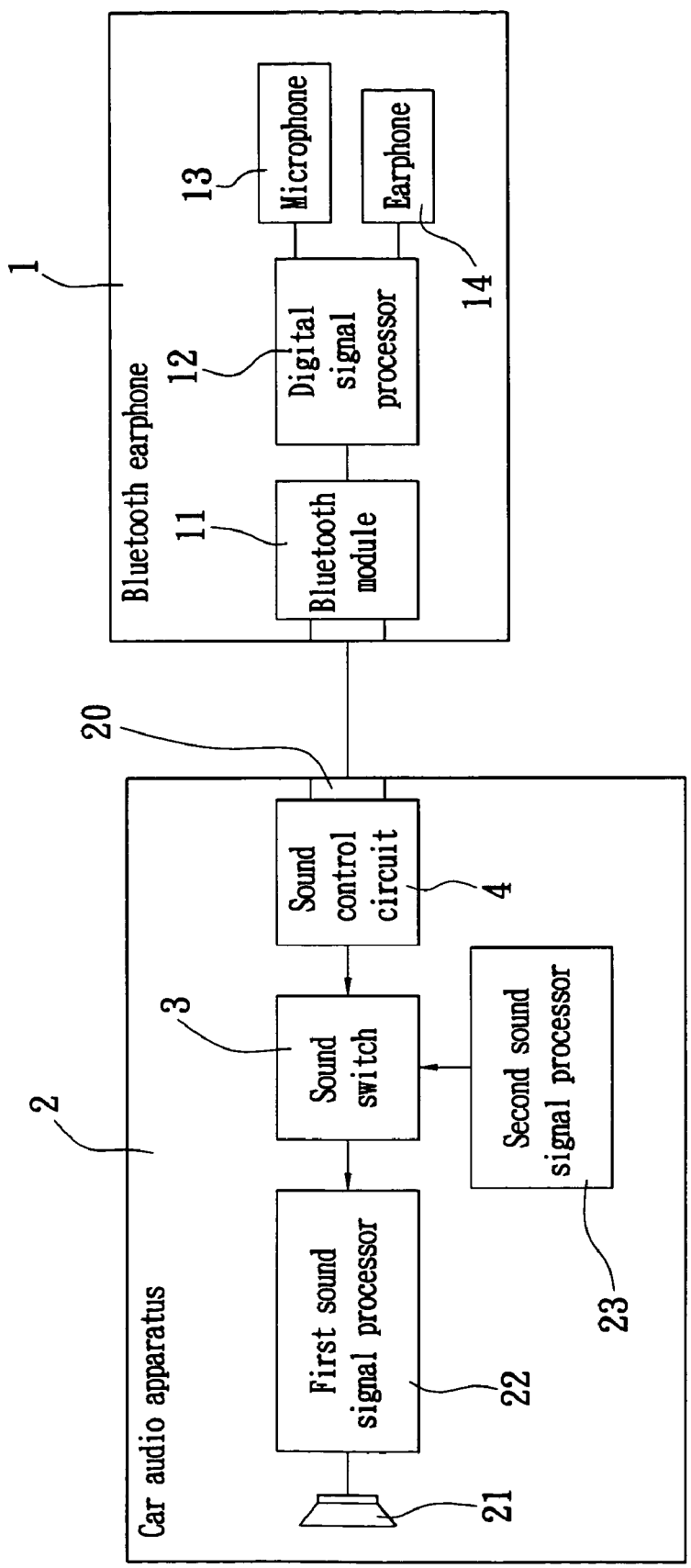
FIG. 3 is a block diagram of the car audio apparatus in accord with the present invention.

Reference is made to FIGS. 2 and 3. The present invention is a control module co-constructed with a car audio apparatus. By combining with the circuit of the car audio apparatus, the present invention can perform a switch action to silence the car audio apparatus 2 automatically and output the sound signals sent from the Bluetooth earphone 1 via a speaker when the Bluetooth earphone 1 is plugged into a socket of the car audio apparatus 2. It primarily includes a Bluetooth module 11, a car audio apparatus 2, a sound switch 3 and a sound control circuit 4.

The Bluetooth module 11 is an interface between the Bluetooth earphone 1 and the car audio apparatus 2 or an interface of other types of wireless communication. In the embodiment of the present invention, it is disposed in the Bluetooth earphone 1 and connected with a digital signal processor 12, which is connected with microphone 13 and an earphone 14, respectively. The digital signal processor 12 is used to convert the analog signals sent from the microphone 13 into digital signals, encode/decode the sound signals, process the signals and send the processed signals via the Bluetooth module 11.

The car audio apparatus 2 has at least a speaker 21 for sound output. The speaker 21 is connected with a first sound signal processor 22. The car audio apparatus 2 further has a second sound signal processor 23, which is connected with a radio receiver, a tape player, compact disk (CD) player and so forth (not shown). Since the assemblies of the car audio apparatus are well known, the related techniques will not be described further. The car audio apparatus has a socket 20 disposed on its panel.

The sound control circuit 4 is disposed inside the car audio apparatus 2 and connected with the sound switch 3. When the Bluetooth earphone 1 is plugged into the socket 20 of the car audio apparatus 2 to make car audio apparatus 2 connect with the Bluetooth module 11, the sound switch 3 will switch automatically to silence the car audio apparatus 2 and output the sound signals sent from the Bluetooth earphone 1 via the speakers 21. On the other hand, when the Bluetooth earphone 1 is taken out from the socket 20, the sound switch 3 will switch back to the audio apparatus.

In conclusion, the present invention can automatically silence the car audio apparatus and make it output the sound signals sent from the Bluetooth earphone via the speakers when the Bluetooth earphone is plugged into the socket of the car audio apparatus to make car audio apparatus connect with the Bluetooth module. On the other hand, when the Bluetooth earphone is taken out from the socket, the present invention will serve as the audio apparatus.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A control module, comprising:
   a car audio apparatus having at least a speaker used for sound output and a socket, the car audio apparatus having a sound switch disposed therein, said sound switch being coupled to a first sound signal processor and a second sound signal processor, said first sound signal processor being counted to said speaker, said second sound signal processor being coupled to a car stereo;
   a Bluetooth module disposed in a Bluetooth earphone to provide an interface between the Bluetooth earphone and the car audio apparatus,
   the sound switch automatically and responsively being used to choose one of said first sound signal processor and second sound signal processor to output sound via the speaker; and
   a sound control circuit disposed inside the car audio apparatus and connected with the sound switch;
   wherein when the Bluetooth earphone is plugged into the socket of the car audio apparatus to make car audio apparatus connect with the Bluetooth module, the sound switch automatically chooses said first sound signal processor and outputs the sound signal sent from the Bluetooth earphone via the speaker, and when the Bluetooth earphone is taken out from the socket, the car audio apparatus serves as a common audio apparatus and said sound switch chooses said second sound signal processor to output to said speaker.

2. The control module as claimed in the claim 1, wherein the Bluetooth module is connected with a digital signal processor, wherein the digital signal processor is connected to a microphone and an earphone, and the digital signal processor is used to convert an analog signal sent from the microphone into a digital signal, encode/decode the first sound signal, process signals and send the processed signals via the Bluetooth module.

* * * * *